(12) United States Patent
Kamigawa et al.

(10) Patent No.: US 10,991,968 B2
(45) Date of Patent: Apr. 27, 2021

(54) CONVEYING DEVICE

(71) Applicant: Murata Manufacturing Co., Ltd., Nagaokakyo (JP)

(72) Inventors: Hideyasu Kamigawa, Nagaokakyo (JP); Koichiro Fujiwake, Nagaokakyo (JP); Masayuki Sumita, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 0 days.

(21) Appl. No.: 16/750,220

(22) Filed: Jan. 23, 2020

(65) Prior Publication Data

US 2020/0161693 A1  May 21, 2020

Related U.S. Application Data

(63) Continuation of application No. PCT/JP2018/030118, filed on Aug. 10, 2018.

(30) Foreign Application Priority Data

Aug. 17, 2017 (JP) .............................. JP2017-157564

(51) Int. Cl.
*B65B 35/18* (2006.01)
*B65G 49/06* (2006.01)
*H01M 10/04* (2006.01)
*B25J 15/06* (2006.01)

(52) U.S. Cl.
CPC ..... *H01M 10/0404* (2013.01); *B25J 15/0608* (2013.01); *B25J 15/0616* (2013.01); *B65B 35/18* (2013.01); *B65G 49/068* (2013.01); *B65G 49/069* (2013.01); *H01M 10/049* (2013.01)

(58) Field of Classification Search
CPC .................................................. B65G 49/069
See application file for complete search history.

(56) References Cited

U.S. PATENT DOCUMENTS

| 8,960,745 B2* | 2/2015 | Regan .................. B25J 15/0691 |
| | | 294/65 |
| 9,046,352 B2* | 6/2015 | Aramaki ................. H01M 2/18 |
| 2004/0173072 A1* | 9/2004 | Ishii ..................... H01M 4/8605 |
| | | 83/100 |

FOREIGN PATENT DOCUMENTS

| GB | 2408257 A | 5/2005 | |
| JP | 200575482 A | 3/2005 | |
| JP | 2005075482 A * | 3/2005 | ........... B65G 49/061 |
| JP | 2005247507 A * | 9/2005 | |

(Continued)

OTHER PUBLICATIONS

International Search Report issued for PCT/JP2018/030118, dated Oct. 30, 2018.

(Continued)

*Primary Examiner* — Gerald McClain
(74) *Attorney, Agent, or Firm* — Arent Fox LLP

(57) ABSTRACT

A conveying device includes a flat plate member including a through-hole and a first conveying head that sucks a conveyance object via the through-hole in a state of holding the flat plate member and conveys the flat plate member and the conveyance object to an accommodation case. Moreover, the flat plate member has a shape that prevents an end of the conveyance object from abutting an inner side surface of the accommodation case during placement into the accommodation case.

19 Claims, 7 Drawing Sheets

(56) References Cited

FOREIGN PATENT DOCUMENTS

| JP | 2005247507 A |   | 9/2005  |
|----|--------------|---|---------|
| JP | 2008305951 A |   | 12/2008 |
| JP | 2010208699 A | * | 9/2010  |
| JP | 2010208699 A |   | 9/2010  |
| JP | 2014194863 A | * | 10/2014 |
| JP | 2014194863 A |   | 10/2014 |
| JP | 2016100559 A |   | 5/2016  |
| JP | 2016195092 A |   | 11/2016 |
| JP | 2017084498 A |   | 5/2017  |

OTHER PUBLICATIONS

Written Opinion of the International Searching Authority issued for PCT/JP2018/030118, dated Oct. 30, 2018.

* cited by examiner

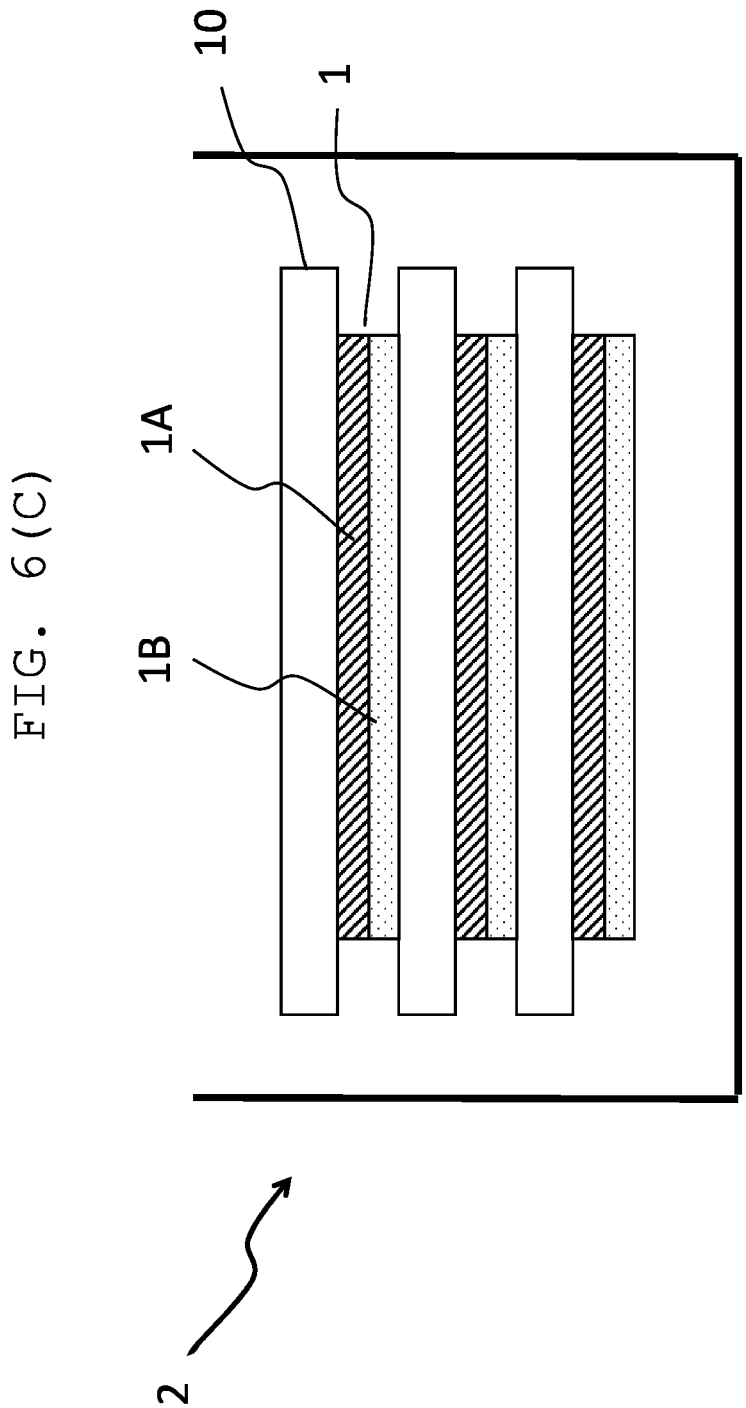

US 10,991,968 B2

CONVEYING DEVICE

CROSS REFERENCE TO RELATED APPLICATIONS

The present application is a continuation of PCT/JP2018/030118 filed Aug. 10, 2018, which claims priority to Japanese Patent Application No. 2017-157564, filed Aug. 17, 2017, the entire contents of each of which are incorporated herein by reference.

TECHNICAL FIELD

The present invention relates to a conveying device, and more particularly to a conveying device that conveys and accommodates a conveyance object in an accommodation case.

BACKGROUND

Patent Document 1 (identified below) describes a conventional electrode foil conveying device that conveys a conveyance object. With the conveying device described in Patent Document 1, the uppermost electrode foil among a plurality of electrode foils stacked in a magazine, which is an accommodation case, is sucked and removed from the magazine and is conveyed to a reception stage with a suction head.

Patent Document 1: Japanese Patent Application Laid-Open No. 2017-84498.

However, with the conveying device described in Patent Document 1, when the electrode foil is sucked and removed from the magazine with the suction head, an end of the electrode foil can contact an inner side surface of the magazine. Moreover, similarly, when the electrode foil is conveyed and accommodated in the magazine, an end of the electrode foil can contact an inner side surface of the magazine.

SUMMARY OF THE INVENTION

Accordingly, the exemplary embodiments disclosed herein address the aforementioned problem. Specifically, it is an object of the present invention to provide a conveying device that prevents a conveyance object from contacting an accommodation case when the conveyance object is conveyed and accommodated in the accommodation case.

In an exemplary aspect, a conveying device of the present invention is provided that conveys and accommodates a conveyance object in an accommodation case. In particular, the conveying device includes a flat plate member including a through-hole; and a first conveying head configured to suck the conveyance object via the through-hole in a state of holding the flat plate member and convey the flat plate member and the conveyance object to the accommodation case. Moreover, the flat plate member is configured in a shape that prevents an end of the conveyance object from abutting an inner side surface of the accommodation case during accommodation into the accommodation case.

In an exemplary aspect, the conveying device can further include a second conveying head configured to hold a top flat plate member accommodated in the accommodation case, suck the conveyance object conveyed together with the flat plate member via the through-hole of the flat plate member, and convey the conveyance object to a predetermined position.

In another exemplary aspect, the first conveying head can be configured to include a suction portion for sucking the conveyance object via the through-hole of the flat plate member and a holding portion for holding the flat plate member.

Moreover, the second conveying head can be configured to include a suction portion for sucking the conveyance object via the through-hole of the flat plate member and a holding portion for holding the flat plate member.

In another exemplary aspect, the holding portion can be configured to suck the flat plat member to hold the flat plate member.

In another exemplary aspect, the flat plate member can be a metal plate.

Moreover, a collection device for collecting the flat plate member can be further included.

In an exemplary aspect, the flat plate member can be a resin film.

In an exemplary aspect, the conveyance object can be an electrode in which an active material layer is formed on a surface of an electrode foil.

In another exemplary aspect, the electrode can be a one-side electrode in which an active material layer is formed only on one side of an electrode foil.

With the conveying device of the exemplary embodiment, it is possible to prevent a conveyance object from contacting an inner side surface of an accommodation case when the conveyance object is conveyed and accommodated in the accommodation case by a first conveying head. That is, a flat plate member is configured in a shape that prevents an end of a conveyance object from abutting an inner side surface of an accommodation case during accommodation into the accommodation case. Therefore, even when the flat plate member contacts the inner side surface of the accommodation case, the flat plate member functions as a protective member to prevent the conveyance object from contacting the inner side surface of the accommodation case.

BRIEF DESCRIPTION OF DRAWINGS

FIG. 6(c) illustrates a side view of the accommodation case including the object.

DETAILED DESCRIPTION

Exemplary embodiments of the present invention are described below in more detail.

A conveying device of the present invention conveys and accommodates a conveyance object in an accommodation case. An example is described below in which a conveyance object is a one-side electrode in which an active material layer is formed only on one side of an electrode foil.

However, it should be appreciated that the conveyance object is not limited to a one-side electrode and can be a two-side electrode in which an active material layer is formed on both sides of an electrode foil or can be an object other than an electrode, according to alternative aspects.

First Exemplary Embodiment

Figure 1:
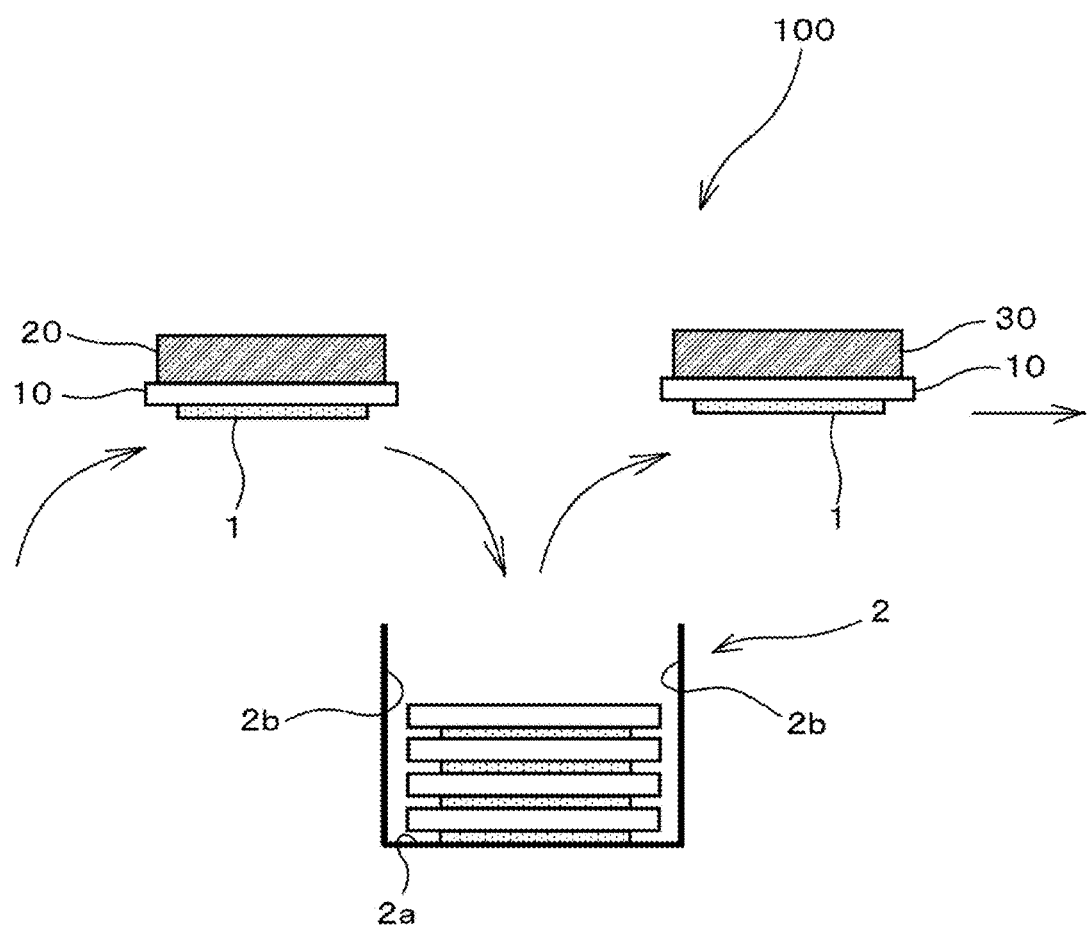
FIG. 1 is a schematic view illustrating a main part configuration of a conveying device of a first exemplary embodiment.

FIG. 1 is a schematic view illustrating a main part configuration of a conveying device 100 of the first embodiment. The conveying device 100 of the first embodiment includes a flat plate member 10, a first conveying head 20, and a second conveying head 30.

An accommodation case 2 includes a bottom surface 2a and a side surface 2b, and has an open upper portion. In the exemplary aspect, the accommodation case 2 is a case for temporarily accommodating an electrode 1, which is a conveyance object.

For example, in cases where an electrode body of a laminated battery in which only an electrode on an outer side in a stacking direction is a one-side electrode and the other electrodes are a two-side electrode is manufactured, because the number of one-side electrodes required is smaller than the number of two-side electrodes required, in some cases, it is better to temporarily accommodate the one-side electrode in the accommodation case 2 for manufacturing efficiency. In such a case, the conveying device 100 of the present embodiment conveys the one-side electrode to the accommodation case 2, and removes the one-side electrode from the accommodation case 2 and conveys the one-side electrode to a predetermined position as necessary.

Figure 2:
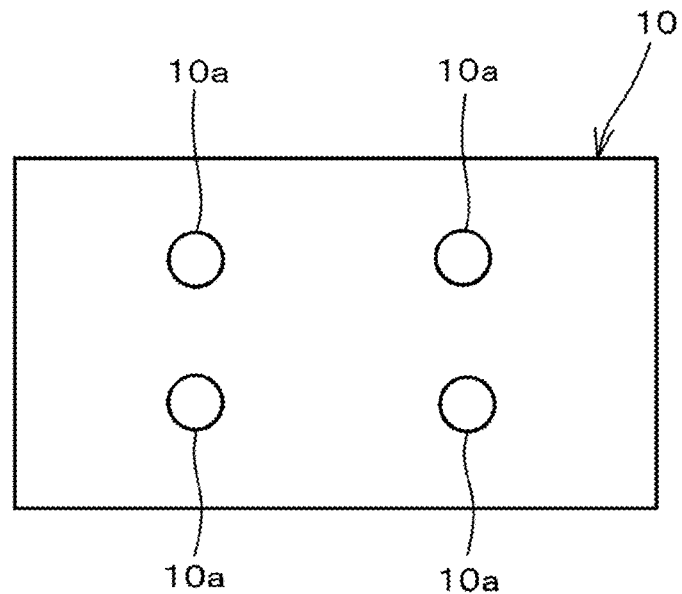
FIG. 2 is a plan view of a flat plate member.

FIG. 2 is a plan view of the flat plate member 10. The flat plate member 10 is a metal plate, e.g., a stainless steel plate, having a thickness of, e.g., 0.5 mm. The flat plate member 10 includes through-holes 10a extending through an upper surface and a lower surface. In the example illustrated in FIG. 2, the four through-holes 10a are provided, but it should be appreciated that the number of through-holes 10a is not limited to four.

The flat plate member 10 is configured in a shape that can prevent an end of the conveyance object from abutting the inner side surface of the accommodation case 2 during accommodation into the accommodation case 2.

Figure 3:
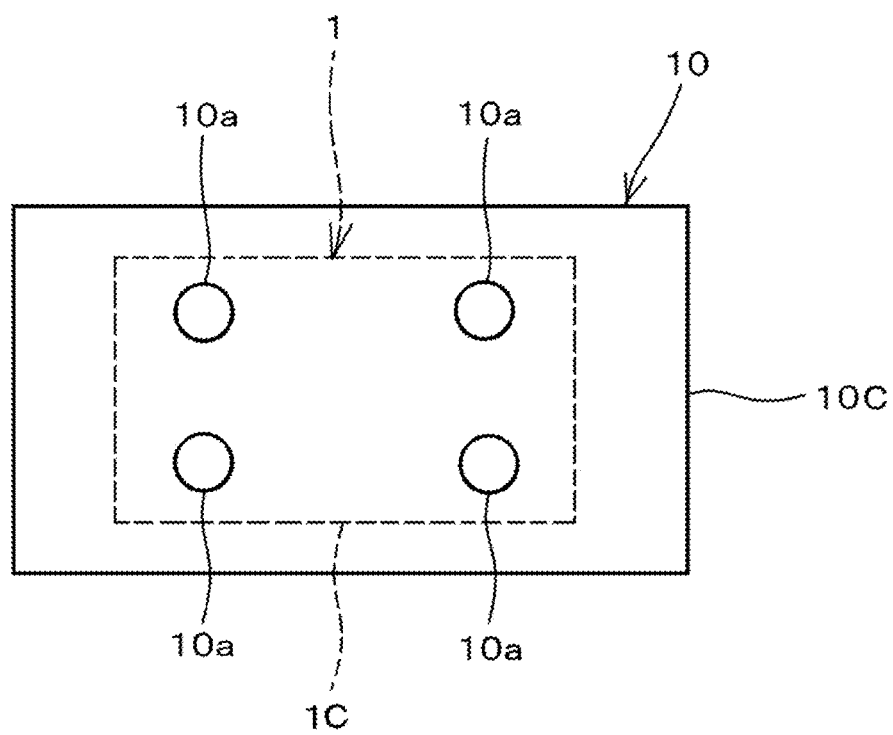
FIG. 3 is a view for comparing the size of a flat plate member and the size of an electrode.

In the present embodiment, the flat plate member 10 has a shape one size larger than the electrode 1, which is a conveyance object, in plan view. That is, the flat plate member 10 has such a shape that, when the electrode 1 and the flat plate member 10 are overlapped with each other with their central positions aligned, as illustrated in FIG. 3, an outer circumferential end 10C of the flat plate member 10 is positioned outside an outer circumferential end 1C of the electrode 1, and the outer circumferential end 1C of the electrode 1, which is a conveyance object, can be prevented from abutting the inner side surface 2b of the accommodation case 2.

Figure 4A:
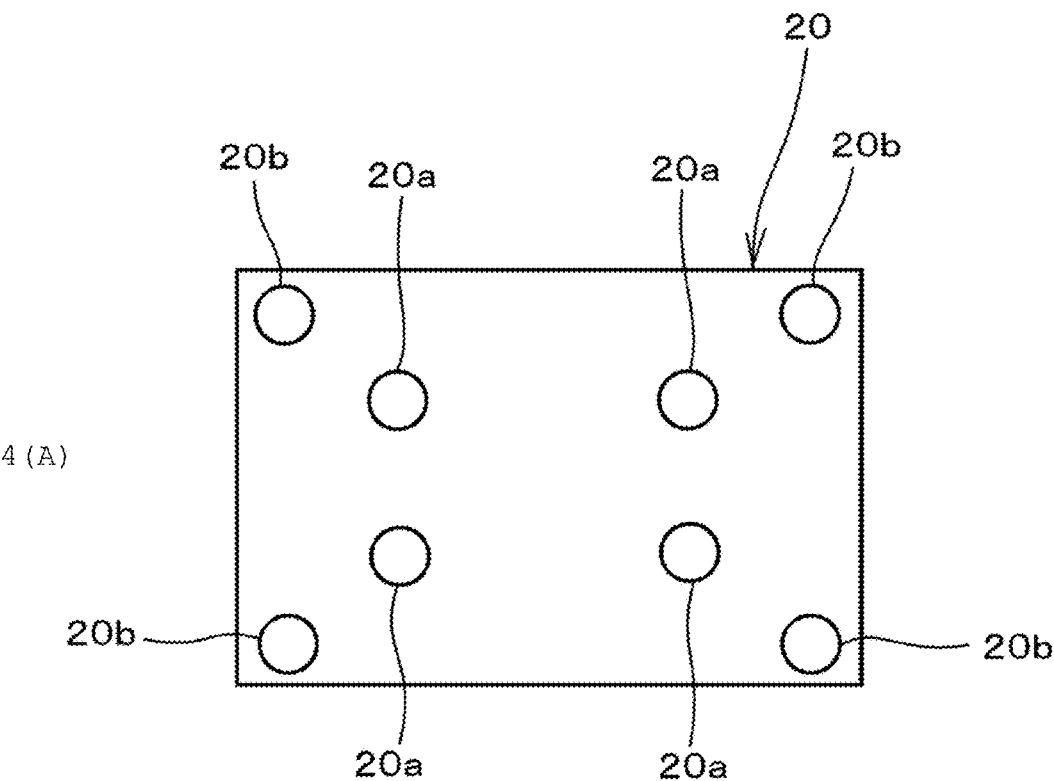
FIG. 4(a) is a plan view illustrating a schematic configuration of a first conveying head.
Figure 4B:
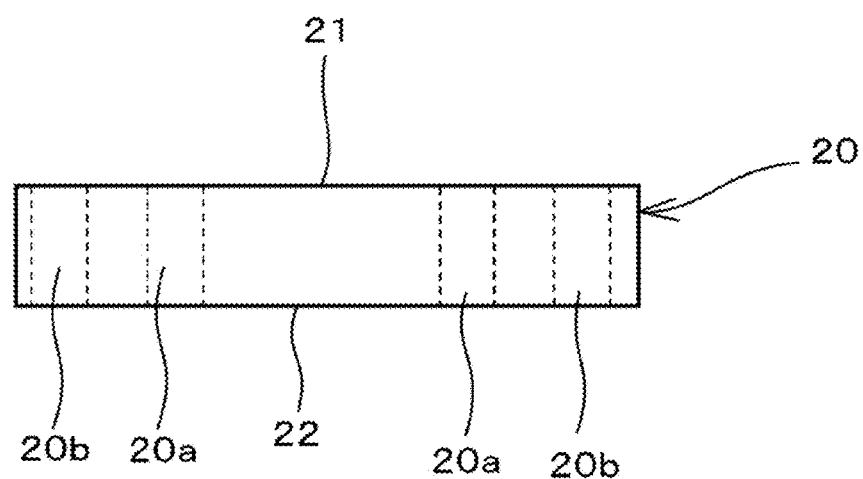
FIG. 4(b) is a side view of the first conveying head.

FIG. 4(a) is a plan view illustrating a schematic configuration of the first conveying head 20, and FIG. 4(b) is a side view of the first conveying head 20.

The first conveying head 20 includes first suction holes 20a (e.g., a first sucking portion according to the present disclosure) and second suction holes 20b (e.g., a second sucking portion according to the present disclosure) extending through an upper surface 21 and a lower surface 22. In the present embodiment, the second suction holes 20b are provided outside the first suction holes 20a, but the positional relationship between the first suction holes 20a and the second suction holes 20b is not limited thereto. Moreover, four first suction holes 20a and four second suction holes 20b are provided, but the numbers of first suction holes 20a and second suction holes 20b are not limited to four. However, in general, it is preferable that the number of the first suction holes 20a is the same as the number of the through-holes 10a of the flat plate member 10 according to the exemplary embodiment.

The first conveying head 20 is configured to perform suction from the upper surface 21 side to suck a suction object to the lower surface 22 and convey the sucked suction object. However, the first conveying head 20 may be configured to include, for example, a suction pad so as to suck a suction object with the suction pad by means of sucking.

The first suction holes 20a and the second suction holes 20b are connected to a suction device (e.g., providing a vacuum pressure), which is not illustrated. Note that the first suction holes 20a and the second suction holes 20b may be connected to the suction device via a suction hose or may be connected to the suction device via a suction chamber and a suction hose, which are not illustrated. When the first conveying head 20 includes the suction chamber, the suction chamber can be provided, for example, on the upper surface 21.

The first suction holes 20a form a suction portion for sucking the electrode 1, which is a conveyance object. Moreover, the second suction holes 20b form a holding portion for sucking and holding the flat plate member 10.

Figure 5:
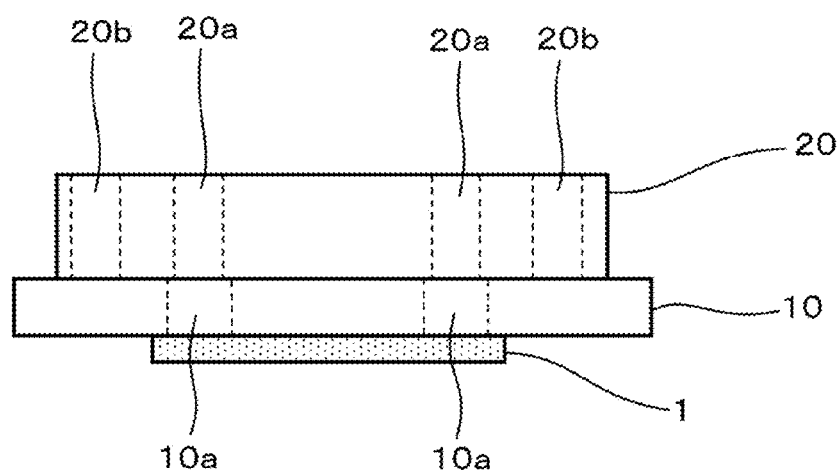
FIG. 5 is a view illustrating a state in which a conveyance object is conveyed with a first conveying head.

In the present embodiment, the first conveying head 20, as illustrated in FIG. 5, in a state of sucking and holding the flat plate member 10 via the second suction holes 20b, sucks the electrode 1 via the first suction holes 20a and the through-holes 10a, and conveys the sucked flat plate member 10 and electrode 1 to the accommodation case 2. Therefore, the first conveying head 20, in sucking the flat plate member 10, sucks the flat plate member 10 after the first suction holes 20a are aligned to overlap with the through-holes 10a of the flat plate member 10 in a vertical direction.

In order to facilitate alignment between the first suction holes 20a and the through-holes 10a of the flat plate member 10, it is preferable that any one of the diameter of the through-holes 10a of the flat plate member 10 and the diameter of the first suction holes 20a of the first conveying head 20 be larger than the other. In the present embodiment, the diameter of the through-holes 10a of the flat plate member 10 is formed to be larger than the diameter of the first suction holes 20a of the first conveying head 20. However, when the diameter of the through-holes 10a is too large, there is a possibility that the electrode 1 is sucked into the through-hole 10a. Therefore, setting to an appropriate diameter is necessary to prevent the electrode 1 from being sucked into the through-hole 10a.

It is noted that, in the present embodiment, the first suction holes 20a and the second suction holes 20b of the first conveying head 20, and the through-holes 10a of the flat plate member 10 have a circular shape in plan view, but the shape is not limited to circle.

The first conveying head 20, when the sucked flat plate member 10 and electrode 1 are conveyed to the accommodation case 2, stops sucking via the first suction holes 20a and the second suction holes 20b in the accommodation case 2. Thus, the flat plate member 10 and the electrode 1 are positioned and released to be accommodated in the accommodation case 2.

As described above, the first conveying head 20 in a state of sucking and holding the flat plate member 10 sucks the electrode 1 and accommodates the flat plate member 10 and the electrode 1 together in the accommodation case 2. At this time, the flat plate member 10 whose outer circumferential end 10C is positioned outside the outer circumferential end 1C of the electrode 1 functions as a protective member for the outer circumferential end 1C of the electrode 1 relative to the inner side surface 2b of the accommodation case 2. Therefore, it is possible to prevent the electrode 1 from contacting the inner side surface 2b of the accommodation case 2. That is, even when the outer circumferential end 10C of the flat plate member 10 contacts the inner side surface 2b of the accommodation case 2, the outer circumferential end 1C of the electrode 1 positioned inside relative to the outer circumferential end 10C of the flat plate member 10 will not contact the inner side surface 2b of the accommodation case 2.

The first conveying head 20 repeats the aforementioned operation, and the electrode 1 and the flat plate member 10 are alternately stacked in order from the bottom in the accommodation case 2.

Figure 6A:
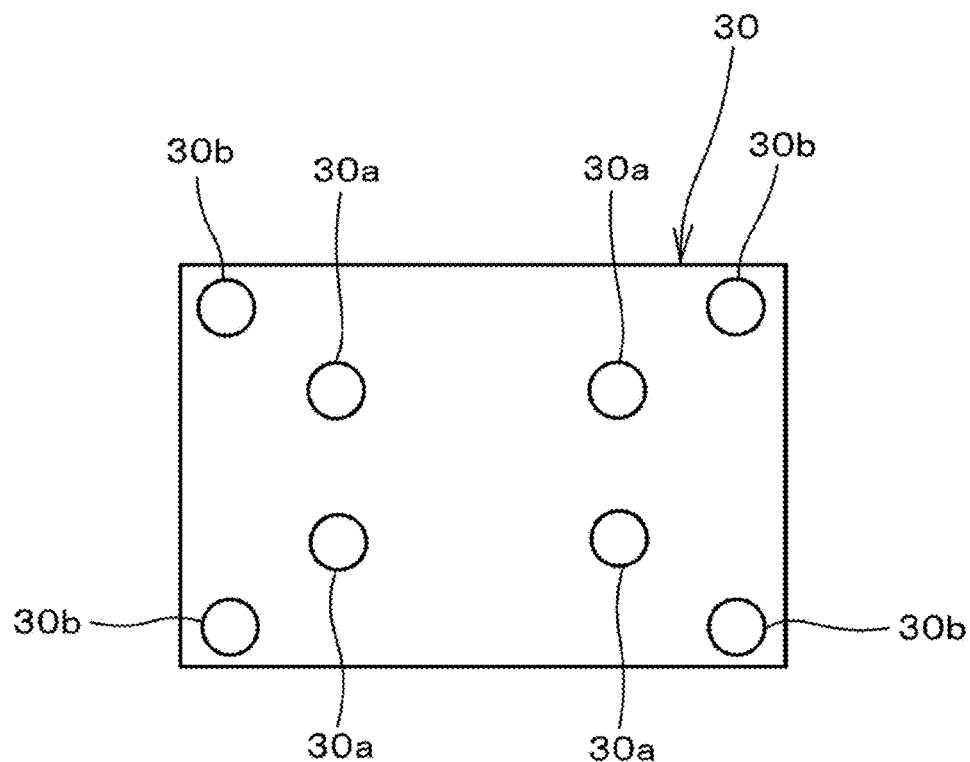
FIG. 6(a) is a plan view illustrating a schematic configuration of a second conveying head.
Figure 6B:
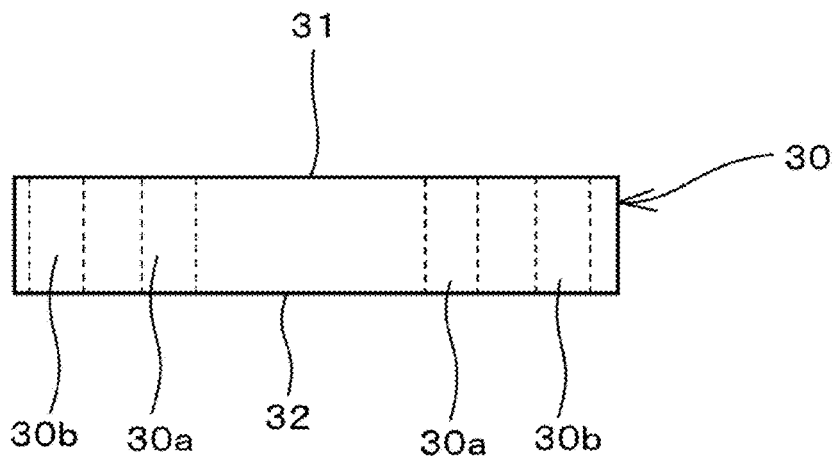
FIG. 6(b) is a side view of the second conveying head.

FIG. 6(a) is a plan view illustrating a schematic configuration of a second conveying head 30, and FIG. 6(b) is a side view of the second conveying head 30. In general, it should be appreciated that the second conveying head 30 has the same structure as that of the aforementioned first conveying head 20 according to the exemplary embodiment.

That is, the second conveying head 30 includes first suction holes 30a extending through an upper surface 31 and a lower surface 32, and second suction holes 30b extending through the upper surface 31 and the lower surface 32 and positioned outside the first suction holes 30a. The first suction holes 30a form a suction portion for sucking the electrode 1, and the second suction holes 30b form a holding portion that sucks and holds the flat plate member 10. In the present embodiment, four first suction holes 30a and four second suction holes 30b are provided, but the numbers of first suction holes 30a and second suction holes 30b are not limited to four. However, the number of the first suction holes 30a is preferably the same as the number of the through-holes 10a of the flat plate member 10 according to the exemplary aspect.

The second conveying head 30 is also configured to perform sucking from the upper surface 31 side to suck the suction object to the lower surface 32 and convey the sucked suction object. However, the second conveying head 30 may be configured to include, for example, a suction pad so as to suck a suction object with the suction pad by means of sucking.

The second conveying head 30 holds the top flat plate member 10 among a plurality of flat plate members 10 accommodated in the accommodation case 2 and sucks the electrode 1 conveyed together with the held flat plate member 10 to the accommodation case 2 via the through-holes 10a of the held flat plate member 10. Then, the sucked flat plate member 10 and electrode 1 are conveyed to a predetermined position.

Similarly, when the second conveying head 30 removes the flat plate member 10 and the electrode 1 from the accommodation case 2, because the flat plate member 10 functions as a protective member for the outer circumferential end 1C of the electrode 1 relative to the inner side surface 2b of the accommodation case 2, it is possible to prevent the electrode 1 from contacting the inner side surface 2b of the accommodation case 2.

In the present embodiment, the second conveying head 30 conveys the sucked flat plate member 10 and electrode 1 to above an elongated separator material. Then, in a state where suction via the second suction holes 30b continues, suction via the first suction holes 30a is stopped. Thus, the electrode 1 is placed on the elongated separator material and released.

Thereafter, the electrode 1 is press-bonded to the elongated separator material by a pressure bonding device, which is not illustrated, and after pressure bonding, the separator material is cut in a predetermined position around the electrode 1. In general, it should be appreciated that such a one-side electrode stacked on the separator is used for manufacturing of an electrode body of a laminated battery cell. That is, the electrode body of the laminated battery cell has a structure in which a positive electrode and a negative electrode are alternately stacked with the separator interposed therebetween, and a one-side electrode is arranged on an outer side in the stacking direction. That is, an assembly in which the one-side electrode is stacked on the separator, which is manufactured by the aforementioned method, is arranged on an outer side in the stacking direction of the electrode body of the laminated battery cell.

It is also noted that while the electrode 1 is conveyed to above the elongated separator material, cleaning for removing dust or the like attached to the electrode 1 may be performed in an exemplary aspect.

Then, the second conveying head 30 collects the sucked flat plate member 10 to a predetermined collection position. That is, in the present embodiment, the second conveying head 30 functions as a collection device. However, it is noted that apart from the second conveying head 30, a collection device for collecting the flat plate member 10 may be provided. Collection of the flat plate member 10 enables reuse of the flat plate member 10, which has been used once.

It is also noted that while the flat plate member 10 is collected to a predetermined collection position, cleaning for removing a foreign substance or the like attached to the flat plate member 10 may be performed in an exemplary aspect.

In addition, it is noted that the timing of collecting the flat plate member 10 is not limited to the aforementioned timing. For example, the flat plate member 10 may be collected after being placed on the elongated separator material together with the electrode 1. In this case, the second conveying head 30 conveys the flat plate member 10 and the electrode 1 to above the elongated separator material, stops suction through the first suction holes 30a and the second suction holes 30b, and places the flat plate member 10 and the electrode 1 on the elongated separator material. Then, for example, in a state where the flat plate member 10 is placed on the electrode 1, pressure bonding the separator material and the electrode 1 is performed by a pressure bonding device, which is not illustrated, and the flat plate member 10 is collected after pressure bonding.

With the conveying device 100 of the first embodiment, the first conveying head 20 in a state of holding the flat plate member 10 sucks the electrode 1, which is a conveyance object, via the through-holes 10a of the flat plate member 10 and conveys the flat plate member 10 and the electrode 1 to the accommodation case 2. The flat plate member 10 is configured in a shape that prevents the outer circumferential end 1C of the electrode 1 from abutting the inner side surface 2b of the accommodation case 2 during accommodation into the accommodation case 2. With such a configuration, when the electrode 1, which is a conveyance object, is accommodated in the accommodation case 2, it is possible to prevent the electrode 1 from contacting the inner side surface 2b of the accommodation case 2. That is, even when the outer circumferential end 10C of the flat plate member 10 that is accommodated in the accommodation case 2 together contacts the inner side surface 2b of the accommodation case 2, the outer circumferential end 1C of the electrode 1 will not contact the inner side surface 2b of the accommodation case 2.

Moreover, with the conveying device 100 of the first exemplary embodiment, the second conveying head 30 holds the top flat plate member 10 accommodated in the accommodation case 2, sucks the electrode 1 conveyed to the accommodation case 2 together with the held flat plate member 10 via the through-holes 10a of the held flat plate member 10, and conveys the electrode 1 to a predetermined position. Thus, similarly, when the electrode 1 is removed and conveyed from the accommodation case 2, because the flat plate member 10 functions as a protective member, it is possible to prevent the electrode 1 from contacting the inner side surface 2b of the accommodation case 2.

Now, when the electrode 1, which is a conveyance object, is a one-side electrode, due to a residual stress between the electrode foil 1B and the active material layer 1A as shown in FIG. 6(c), in some cases, an end has a shape that is curved toward a side where the active material layer 1A is formed relative to a central portion of the electrode foil 1B. However, with the conveying device 100 of the present embodiment, the electrode 1, which is a one-side electrode, is accommodated in the accommodation case 2 together with the flat plate member 10, such that the flat plate member 10 can serve as a weight and thus be configured to correct the curvature of the one-side electrode.

Moreover, with the conveying device 100 of the present embodiment, the electrode 1, which is a conveyance object, is accommodated in the accommodation case 2 in an aspect in which the electrode 1 and the flat plate member 10 are alternately stacked. Similarly, when the electrode 1 is removed from the accommodation case 2, the electrode 1 is removed together with the flat plate member 10.

Thus, when the electrode 1 is removed from the accommodation case 2, it is possible to prevent the plurality of electrodes 1 from being collectively removed unintentionally. Moreover, the electrodes 1 do not contact each other in the accommodation case 2, and therefore, for example, it is possible to prevent a foreign substance attached to one electrode 1 from being attached also to a different electrode 1, as a result of bringing the foreign substance attached to the one electrode 1 into contact with the different electrode 1.

Moreover, with the conveying device 100 of the first embodiment, the first conveying head 20 includes the first suction holes 20a (e.g., a suction portion) for sucking the electrode 1 via the through-holes 10a of the flat plate member 10 and the second suction holes 20b (e.g., a holding portion) for holding the flat plate member 10. Moreover, the second conveying head 30 includes the first suction holes 30a (the suction portion) for sucking the electrode 1 via the through-holes 10a of the flat plate member 10 and the second suction holes 30b (the holding portion) for holding the flat plate member 10. Thus, it is possible to independently perform holding and separation of the flat plate member 10 and suction and separation of the electrode 1.

In particular, with the conveying device 100 of the first embodiment, the aforementioned holding portion is configured to suck the flat plate member 10 and thus hold the flat plate member 10. Therefore, it is possible to independently perform holding and separation of the flat plate member 10 and suction and separation of the electrode 1 by suction.

Moreover, when the flat plate member 10 is a metal plate, it is possible to unfailingly protect the outer circumferential end 1C of the electrode 1, which is a conveyance object.

Moreover, collecting the used flat plate member 10 enables reuse of the collected flat plate member 10.

Second Exemplary Embodiment

In the aforementioned first exemplary embodiment, an example in which a metal plate is used as the flat plate member 10 is described. In the second embodiment, an example in which a resin film is used as the flat plate member 10 is described.

Similarly, in the present embodiment, the flat plate member 10 is configured in a shape that can prevent an end of the conveyance object from abutting the inner side surface 2b of the accommodation case 2 during accommodation into the accommodation case 2. Moreover, the flat plate member 10 is required to have such rigidity that even when contacting the inner side surface 2b of the accommodation case 2, the flat plate member 10 becomes a protective member so as to prevent the conveyance object held together with the flat plate member 10 from contacting the inner side surface 2b of the accommodation case 2.

In the present embodiment, a resin film having such rigidity is used as the flat plate member 10. For example, a PET film can be used as the flat plate member 10. The PET film can have a thickness of, e.g., 0.2 mm to 0.6 mm.

When the resin film is used as the flat plate member 10, similar to the case where the metal plate is used, the through-holes 10a illustrated in FIG. 2 are provided. For example, an elongated resin film material cut into a predetermined size and including the through-holes 10a in predetermined positions can be used as the flat plate member 10. In this case, as compared with the case where the through-holes are provided in the metal plate, the through-holes can be easily provided.

When the resin film is used as the flat plate member 10, the flat plate member 10 that has been used once can be disposed of. Thus, as compared with the case where the flat plate member 10 is collected, cleaned, and then reused, the cleaning process and the collection process can be omitted.

It is noted that the present invention is not limited to the specific features of the exemplary embodiments and various applications and modifications may be made within the scope of the present invention.

Moreover, in the aforementioned embodiment, the conveying device 100 is configured to convey and accommodate the conveyance object in the accommodation case 2, and then remove the conveyance object accommodated in the accommodation case 2 and convey the conveyance object to a predetermined position. However, the conveying device 100 may be configured as a device that conveys and accommodates the conveyance object in the accommodation case. In this case, as a configuration of the conveying device 100, the second conveying head 30 can be omitted.

In the aforementioned embodiment, the first conveying head 20 and the second conveying head 30 are described to suck and hold the flat plate member 10 by suction, but it is noted that the flat plate member 10 may be held through a method other than suction in an alternative aspect. For example, when the flat plate member 10 is a metal plate that is attracted to a magnet, the first conveying head 20 and the second conveying head 30 may include a magnet so as to magnetically hold the flat plate member 10. Moreover, the first conveying head 20 and the second conveying head 30 may be configured to mechanically hold the flat plate member 10, e.g., by holding the flat plate member 10 in a clamping manner.

In the aforementioned embodiment, the first conveying head 20 and the second conveying head 30 are described to have the same structure, but may have different structures in an alternative aspect.

Moreover, it is sufficient that if the flat plate member 10 is configured in a shape that can prevent an end of the conveyance object from abutting the inner side surface 2b of the accommodation case 2 during accommodation into the accommodation case 2, and the shape is not limited to the shape illustrated in FIG. 2.

Figure 7:
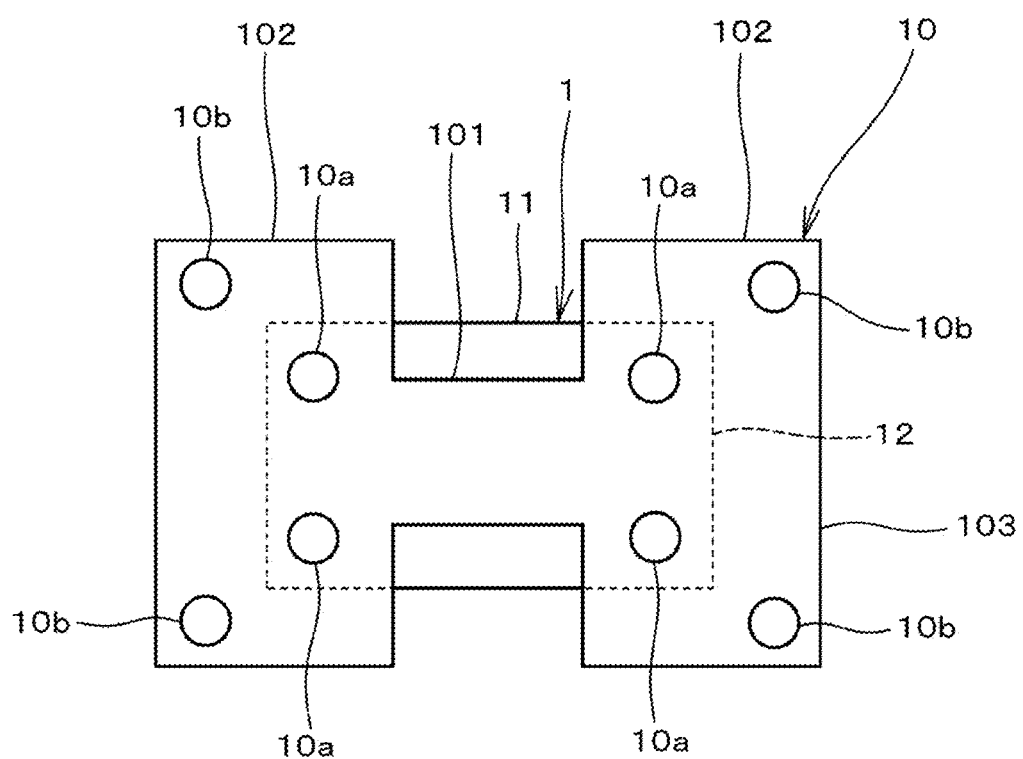
FIG. 7 is a plan view illustrating an example of another shape of a flat plate member.

FIG. 7 is a plan view illustrating an example of another shape of the flat plate member 10. FIG. 7 also illustrates the electrode 1, which is a conveyance object, for the sake of easy understanding.

The flat plate member 10 illustrated in FIG. 7 has a portion in which an outer circumferential end of a long side is inwardly recessed as compared with the flat plate member 10 illustrated in FIG. 2. That is, the flat plate member 10 illustrated in FIG. 7 includes a first outer circumferential end 101 that is positioned on an inner side and a second outer circumferential end 102 that is positioned outside relative to the first outer circumferential end 101 in an outer circumferential end parallel to a long side of the electrode 1. In a state of being overlapped with the electrode 1 during conveyance to the accommodation case 2 and during conveyance from the accommodation case 2, as illustrated in FIG. 7, the first outer circumferential end 101 is positioned inside relative to a long-side outer circumferential end 11 of the electrode 1. However, because the second outer circumferential end 102 is positioned outside relative to the long-side outer circumferential end 11 of the electrode 1, the second outer circumferential end 102 is configured to protect the long-side outer circumferential end 11 of the electrode 1.

Moreover, it is noted that, as illustrated in FIG. 7, a short-side outer circumferential end 103 of the flat plate member 10 is positioned outside relative to a short-side outer circumferential end 12 of the electrode 1, and functions to protect the short-side outer circumferential end 12 of the electrode 1.

That is, the flat plate member 10 has an end closer to the inner side surface 2b of the accommodation case than to an end of the conveyance object closest to the inner side surface 2b of the accommodation case 2 during accommodation into the accommodation case 2. By focusing on the conveyance aspect of the first conveying head 20, it can also be said that the first conveying head 20 conveys the flat plate member 10 and the conveyance object in an aspect that the end of the flat plate member 10 is in a position closer to the inner side surface 2b of the accommodation case 2 than the end of the conveyance object.

DESCRIPTION OF REFERENCE SYMBOLS

1: Electrode
2: Accommodation case
2a: Bottom surface
2b: Side surface
10: Flat plate member
10a: Through-hole
20: First conveying head
20a: First suction hole of first conveying head
20b: Second suction hole of first conveying head
30: Second conveying head
30a: First suction hole of second conveying head
30b: Second suction hole of second conveying head
100: Conveying device

The invention claimed is:

1. A conveying device that conveys an object into an accommodation case, the conveying device comprising:

a flat plate member that includes at least one through-hole that extends directly from an upper surface to a bottom surface thereof; and
a first conveying head configured to suck the object via the at least one through-hole when the first conveying head is holding the flat plate member and to convey the flat plate member and the object into the accommodation case,
wherein the flat plate member is configured in a shape that prevents an end of the object from abutting an inner side surface of the accommodation case when the first conveying head conveys the flat plate member and the object into the accommodation case,
wherein the first conveying head includes a first suction portion with at least one through-hole configured to suck the object via the at least one through-hole of the flat plate member,
wherein the first conveying head includes a second suction portion configured to suck the flat plate member to hold the flat plate member thereto, and
wherein the at least one through-hole of the flat plate member has a diameter that is larger than a diameter of the at least one through-hole of the first suction portion.

2. The conveying device according to claim 1, further comprising a second conveying head configured to hold a top flat plate member accommodated in the accommodation case, suck the object together with the top flat plate member via the at least one through-hole of the respective flat plate member, and convey the object to a predetermined position.

3. The conveying device according to claim 2, wherein the second conveying head includes a suction portion configured to suck the object via the through-hole of the flat plate member and a holding portion configured to hold the flat plate member.

4. The conveying device according to claim 1, wherein the flat plate member is a metal plate.

5. The conveying device according to claim 1, further comprising a collection device configured to collect the flat plate member.

6. The conveying device according to claim 1, wherein the flat plate member is a resin film.

7. The conveying device according to claim 1, wherein the object is an electrode in which an active material layer is disposed on a surface of an electrode foil.

8. The conveying device according to claim 7, wherein the electrode is a one-side electrode in which the active material layer is disposed only on one side of the electrode foil.

9. The conveying device according to claim 1, wherein the first suction portion of the first conveying head includes a plurality of through-holes including the at least one through-hole therein that is aligned to the at least one through-hole of the flat plate member, such that a suction force applied to the respective through-hole sucks the object via the at least one through-hole of the flat plate member.

10. The conveying device according to claim 9, wherein the second suction portion of the first conveying head includes a suction hole that is not aligned to the at least one through-hole of the flat plate member, such that a suction force applied to the suction hole configures the first conveying head to hold the flat plate member.

11. The conveying device according to claim 1, wherein the flat plate member comprises an outer circumference that is wider than a circumference of the object and configured to prevent the object from abutting the inner side surface of the accommodation case when the conveying head conveys the flat plate member and the object into the accommodation case.

12. The conveying device according to claim 1, wherein the first conveying head comprises a flat surface that couples to a flat surface of the flat plate member when the second suction portion sucks the flat plate member thereto, such that the first suction portion is aligned to the at least one through-hole of the flat plate member to suck the object therethrough.

13. A conveying device that conveys an object into an accommodation case, the conveying device comprising:
- a flat plate member that includes at least one through-hole that extends directly from an upper surface to a bottom surface thereof; and
- a conveying head that includes:
  - a first suction portion configured to suck the object via the at least one through-hole of the flat plate member when aligned in a sucking direction with at least one through-hole of the first suction portion, such that the object and the flat plate member are collectively held by the conveying head, and
  - a second suction portion configured to hold the flat plate member thereto by sucking the flat plate member via at least one suction hole of the second sucking portion,
- wherein the conveying head is configured to convey the flat plate member and the object into the accommodation case,
- wherein the flat plate member is configured in a shape that prevents the object from abutting an inner side surface of the accommodation case when the conveying head conveys the flat plate member and the object into the accommodation case.

14. The conveying device according to claim 13, wherein the flat plate member comprises an outer circumference that is wider than an outer circumference of the object and configured to prevent the object from abutting the inner side surface of the accommodation case when the conveying head conveys the flat plate member and the object into the accommodation case.

15. The conveying device according to claim 13, wherein the conveying head comprises a flat surface that couples to a flat surface of the flat plate member when the at least one suction hole of the second suction portion sucks the flat plate member thereto, such that the at least one through-hole of the first suction portion is aligned to the at least one through-hole of the flat plate member to suck the object therethrough.

16. The conveying device according to claim 13, further comprising a second conveying head configured to hold a top flat plate member accommodated in the accommodation case, suck the object together with the top flat plate member via the at least one through-hole of the respective flat plate member, and convey the object to a predetermined position.

17. The conveying device according to claim 13, wherein the object is an electrode in which an active material layer is disposed on a surface of an electrode foil.

18. The conveying device according to claim 17, wherein the electrode is a one-side electrode in which the active material layer is disposed only on one side of the electrode foil.

19. The conveying device according to claim 13, wherein the at least one suction hole of the conveying head is not aligned to the at least one through-hole of the flat plate member, such that a suction force applied to the at least one suction hole configures the conveying head to hold the flat plate member.

* * * * *